United States Patent [19]
Copeland

[11] 3,731,936
[45] May 8, 1973

[54] COMPETITION BRIDGE CARDS

[76] Inventor: Ben H. Copeland, 2066 East Balboa, Tempe, Ariz. 85282

[22] Filed: Oct. 12, 1971

[21] Appl. No.: 188,191

[52] U.S. Cl. ....................273/149 P
[51] Int. Cl. ....................A63f 1/14
[58] Field of Search ....................273/149 P

[56] References Cited

UNITED STATES PATENTS

| | | | |
|---|---|---|---|
| 3,658,342 | 4/1972 | Boren | 273/149 P |
| 3,165,319 | 1/1965 | Benima | 273/149 P |
| 1,887,203 | 11/1932 | Hoke | 273/149 P |

*Primary Examiner*—Anton O. Oechsle
*Attorney*—William C. Cahill et al.

[57] ABSTRACT

A deck of playing cards having the back side of each card coded by means of a plurality of dots. The pattern of dots is identical on each card but is longitudinally and/or laterally displaced by a different amount on each card. An overlay card is divided into distinct areas with a selected positioning of a plurality of apertures, or transparent portions, in each area. On registration of the overlay card with each playing card, one of the dots in the card will be visible through one of the apertures in the overlay card. The area within which that dot appears directs the dealer as to which of the players is to receive that card. This process continues until all cards in the playing deck have been dealt. In this manner, the players will receive a predetermined arrangement of cards.

10 Claims, 4 Drawing Figures

INVENTOR
BEN H. COPELAND

BY
Cahill, Sutton, Thomas & Phillips
ATTORNEYS

INVENTOR
BEN H. COPELAND
BY
Cahill, Sutton, Thomas & Phillips
ATTORNEYS

COMPETITION BRIDGE CARDS

The present invention relates to a coding arrangement for playing cards, whereby a predetermined set of cards may be dealt to each player.

In the known systems for distributing a prearranged hand to bridge players, various devices and mechanisms have been used. One system required that the cards have apertures whereby the card could be placed over a master jig containing a plurality of player identifying symbols. The symbol visible through the aperture indicated the player to whom the card should be dealt. This system suffered from the problem of slow play in that each card must be taken from the top of the deck, placed in the jig to determine which player is to receive it and then dealt. The requirement that the cards have holes in them is impractical in that while shuffling or otherwise handling the cards, the corner of one card may become caught in the hole of another and cause damage to one or both cards.

In another system, the deck of cards was placed within a jig having a keyed template. This template had an aperture which registered with one of the printed player positions located on the deck of cards. In yet another system, each of the cards contained on the back thereof directions for placing that particular card.

In the second and third described systems, the printing on the back of the cards could have been memorized relatively easily in respect to the more important cards. Thereby, it became relatively easy to know the cards held by an opponent which destroyed the pleasure of the game. These systems also had the disadvantage in that the symbols on each card had to be read, rather than just recognized, which tended to slow down the process of dealing the cards. The small size of the symbols also tended to cause eye strain.

Many card games have fervent devotees who are diligently involved in the pursuit of perfection in playing any given hand. One such game is that of bridge. As there are tournaments for this game at all levels up to international competition, many devotees read about and discuss the hands played, thereby attempting to hone their own play to that of the experts. As it is well known that doing is more educational than talking, many devotees attempt to replay the hands with their compatriots so as to learn first hand how the play should and could be done. To accomplish this end, the players must be dealt prearranged hands corresponding to those of a particular game at a tournament. Necessarily, the dealer must have knowledge of which card is to be dealt to each player. This may, of course, be accomplished by having a fifth person (nonplayer) deal the cards according to a known plan of distribution, but this may be impractical in requiring a fifth person. If one of the players deals, he, of course, has an unfair advantage in that he will know which players have what cards. Thus, the distribution of the cards must be by a scheme whereby a prearranged hand may be dealt to the players without any of the players knowing the contents of the hands of the other players. Furthermore, the scheme for distributing the cards must be such that several different hands may be dealt without requiring a new deck of cards for each hand and the scheme must not be overly time-consuming in distributing the cards.

It is therefore a primary object of the present invention to provide a coded deck of cards which may be decoded as to the player who is to receive it with an overlay card.

Another object of the present invention is to provide a scheme for coding the backs of playing cards which may co-operate with a plurality of different overlay cards.

Still another object of the present invention is to provide a scheme for distributing a prearranged hand to players where the correlation between the coding of each card and its face side is difficult to memorize.

A still further object of the present invention is to provide a coding scheme which is easily recognizable with an overlay card.

These and other objects of the present invention will become apparent to those skilled in the art as the description thereof proceeds.

The present invention may be described by reference to the accompanying drawings, in which.

In essence, the invention comprises coded playing cards with a fixed number of colored dots having a constant spatial relationship, but shifted as a group for each card about the back of the card. An overlay card (hereafter referred to as an overlay), corresponding to one prearranged hand, is placed over each card and the position of the dot visible therethrough indicates the player who is to receive that particular card.

Figure 1:
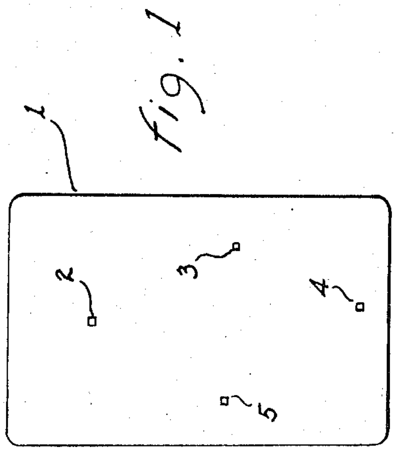
FIG. 1 illustrates the arrangement of dots on a playing card.

In detail, reference is made to FIG. 1 illustrating a playing card 1 to be used in the invention. The playing card 1 may have a white background in order that the four dots 2, 3, 4, and 5 illustrated may be distinct. There may or may not be a border. Each of the 52 cards plus the two jokers in a deck of cards has this same pattern for the group of dots. The orientation of each group of dots with respect to any side of the playing card 1 always remains the same, but the position of the group of dots on the back of each card is different as the group of dots shifts upwards, downwards, or sideways. Thereby, each card is coded.

Figure 2:
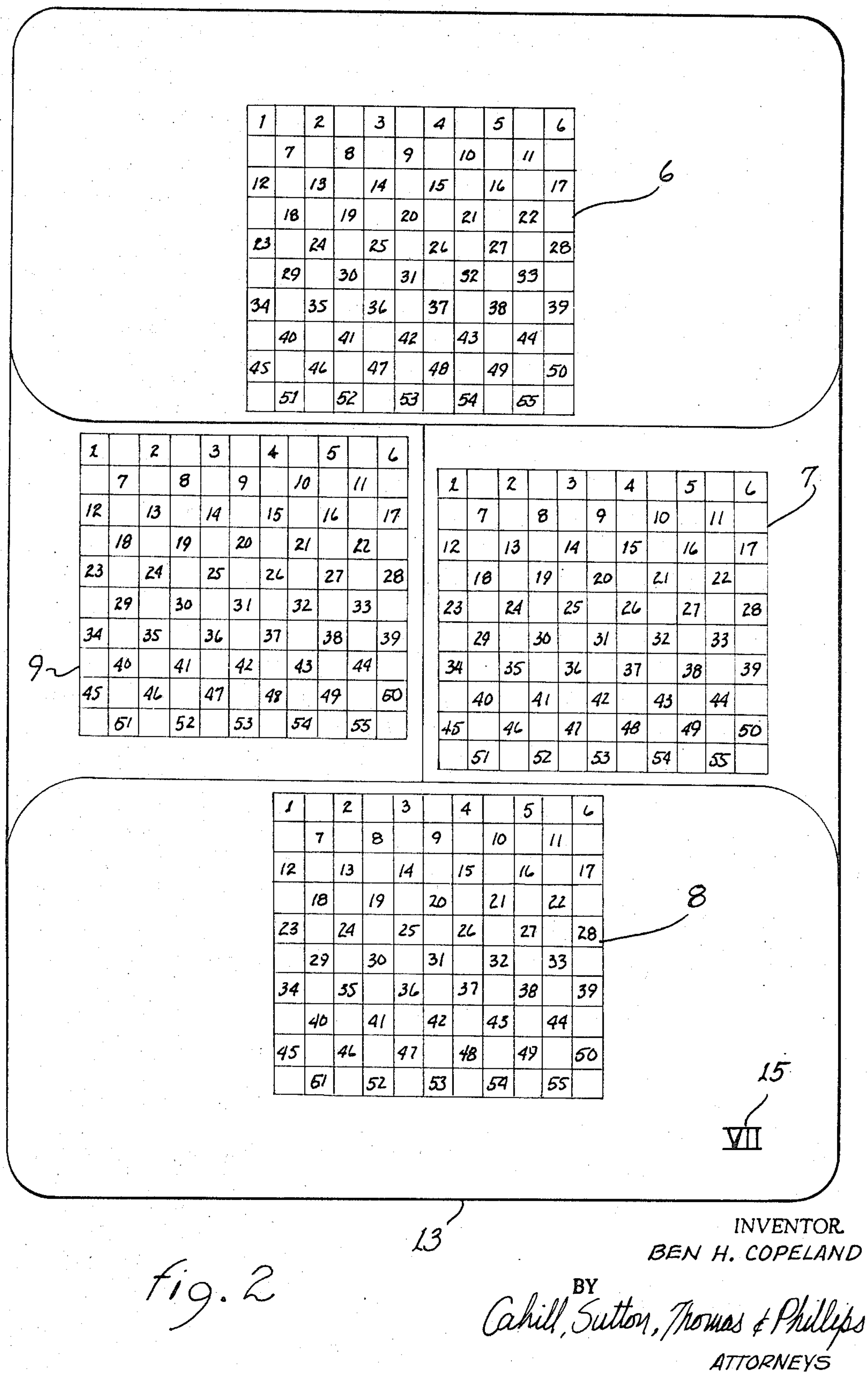
FIG. 2 illustrates the grid system for positioning the dots and apertures.

In FIG. 2, there is illustrated a pattern 13 by which the dots are located. Each of the grids 6, 7, 8, and 9 indicate the possible positions of dots 2, 3, 4, and 5, respectively. Each of the grids, as shown, comprise a matrix of ten by eleven (10 × 11) producing 110 small squares. The squares are numbered alternately, resulting in 55 numbered squares. As there are 52 playing cards in each deck for the game of bridge, three numbered squares are unnecessary, and, therefore, one is unassigned and two are assigned to jokers. The grids are arranged with respect to the center of the card such that grid pairs 6 and 8 are oppositely displaced laterally and longitudinally from the center of the card by the same number of squares. Similarly, grid pairs 7 and 9 are oppositely displaced laterally and longitudinally from the center of the card. Thusly, if a grid on one pair of grids were rotated 180°, the grids would overlie one another and the numbered squares of one grid of a pair would register with the unnumbered squares of its corresponding grid.

The position of the dots 2, 3, 4, and 5 on the playing cards is arranged such that a card, arbitrarily designated as number 1, has its dots arranged to register with the squares marked 1 of each of the grids 6, 7, 8, and 9; card number 2 has its dots arranged to register with squares marked 2, etc. If desired, the extra unassigned square may be located other than at the square marked 55. In this manner, each of the 52 playing cards and two jokers are first numbered and then coded.

Figure 4:
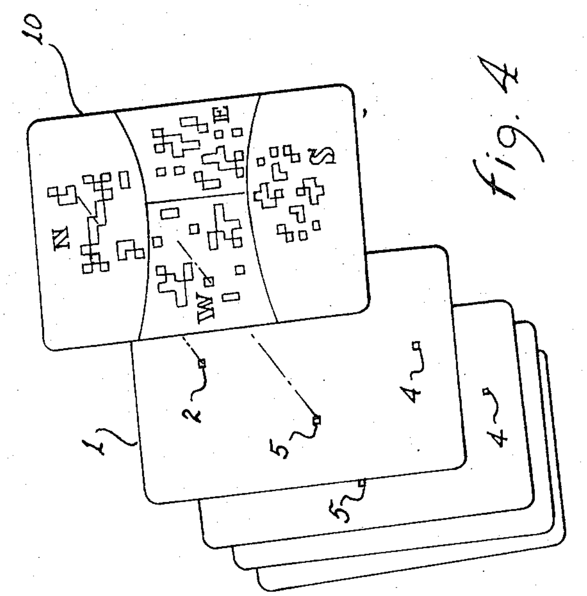
FIG. 4 illustrates the registration between the overlay card and the playing card.
Figure 3:
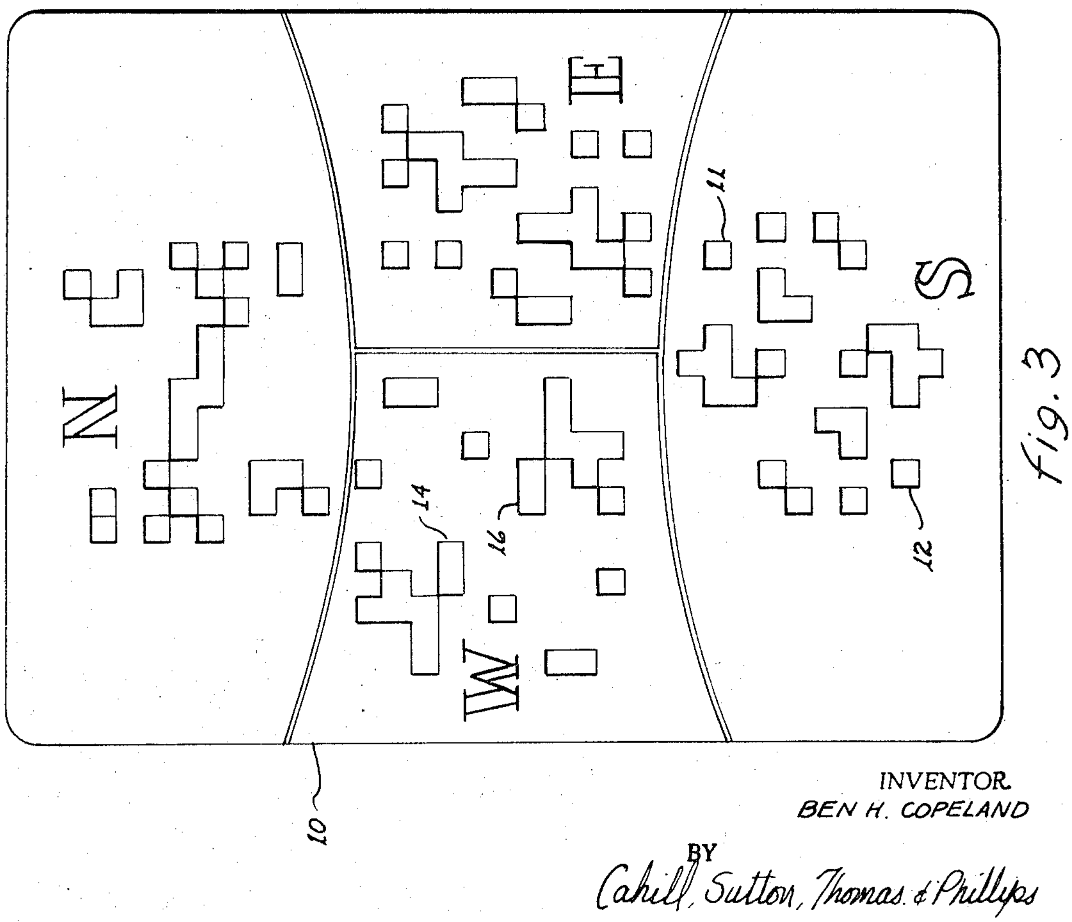
FIG. 3 illustrates the overlay card.

The overlay 10 as shown in FIG. 3 is designed such that one of the dots of each card will be visible through one of the apertures. If desired, there may be transparent portions in overlay 10 corresponding to the apertures 11 and they are deemed equivalents. The overlay 10 has the apertures grouped into four areas marked N, E, W, and S. Each of these correspond to the positions of the players, where the dealer is represented as S, the player to the left as W, the player opposite as N, and the player to the right as E. The position of the visible dot within one of these aperture groupings will indicate the player who is to receive that card. FIG. 4 illustrates the registration of the playing card 1 with the overlay 10. Herein, the dot is shown to be visible through one of the apertures grouped in the area marked W.

The arrangement of the apertures within the overlay 10 must follow a prescribed order, depending on the cards each player is to receive. For any predetermined arrangement of hands, the player who is to receive a particular card must be known to construct the overlay 10. In order for a player, for instance S, to receive the correct cards, each of his cards, when placed under the overlay, must show a dot within the grouping of apertures marked S. This may be accomplished by making an aperture in the overlay 10 within the grouping marked S which registers with the numbered squares in grid 8 having the same numbers as the numbered cards he is to receive. Thus, any card, when placed under the overlay and corresponding to a card destined for S will have a dot corresponding to an aperture in grouping S. The same scheme is used for the cards destined for N, E, and W.

If the playing cards are not to be indexed prior to registration, it would be possible that either dot 2 or dot 4 of a playing card, such as numbered card 11, might be within the general aperture grouping S of the overlay. If that card were in fact intended for S, either of the dots must be visible through an aperture in grouping S. Dot 4 will, of course, be visible through overlay 10 as the overlay will have an aperture 11 in grouping S corresponding to square 11. As dots 2 and 4 are not equidistant from the center of the card 1, the aperture cooperating with dot 4 will not cooperate with dot 2. Previously, it was stated that the grid pairs 6 and 8 corresponding with dots 2 and 4, respectively, were equally displaced longitudinally and laterally from the center of the card. Thus, a numbered square in grid 6 will correspond with an unnumbered square of grid 8 if the grids were rotated 180°. In order for dot 2 to be visible through the overlay 10, should the card in question be reversed, there must be an aperture 12 corresponding to the position of dot 2 in this configuration. The position of the aperture 12 may be determined as follows. Its position with respect to grid 8 will be on a line from square 11 through the center of grid 8 and equidistant therefrom. The square now registering with dot 2 of grid 8 will necessarily be an unnumbered square due to the relationship of grid 6 to grid 8. An aperture 12 is then made in the overlay 10 which corresponds to this square. Thus, either dot 2 or dot 4 will be visible through the overlay 10 within the grouping of apertures marked S, but neither dot will be visible through the apertures in the grouping marked N. In either case, S, the predetermined recipient, will receive the card. Because card 11 is destined for S, there will be no apertures within the groupings marked N, E and W which correspond with the squares marked 11 in grid pairs 7 and 9 respectively. Thus, in either the normal or reversed positions of card 11, no dot will show through the overlay within the N, E and W groupings.

Similarly, if card 37 were destined for W, the overlay 10 would have an aperture 16 in the grouping marked W corresponding to square 37 of grid 9 to permit dot 5 to be visible. If the cards were to be dealt without indexing, it would be possible that card 37 would be reversed. Thus, dot 3 must register with a square of grid 9. In order to be seen within the area W, there must be an aperture 14 corresponding to this position of dot 3. The grids 7 and 9 are oriented with respect to each other such that they are equally displaced longitudinally and laterally from the center of the card. Thus, the new position of dot 3 would correspond to an unnumbered square of grid 9. As that square will not interfere with any correctly oriented card and its dots, an aperture 14 may be made corresponding to the unnumbered square. Thus, for card 37 a dot will appear in the grouping W when the overlay 10 is placed thereon regardless of the orientation of the card 37.

In actual play, the dealer would shuffle the deck in the standard fashion and align the cards in the normal manner prior to dealing. The overlay 10 selected and which represents a particular hand to be played would be placed over the topmost card. The position of the dot (2, 3, 4, or 5) visible through the overlay 10 would then determine which player is to receive the topmost card. The card would then be distributed, and the overlay 10 placed on the next card to determine which player is to receive it, and so on until the whole deck has been dealt. On completion of the deal, play would begin.

The number of different overlays corresponding to the number of different games is limited only by the mathematical combination of number of players, number of cards, and whether the cards must be aligned prior to identification. For all practical purposes, the number of different games that may be played is infinite.

The scope of this invention is applicable to any type of card game for any number of players receiving any number of cards. However, the appeal of the invention is of particular interest to bridge votaries as they are very interested in improving their skills by emulating and possibly even improving upon the play of the experts. The invention through the use of the coded cards and overlays provides a means whereby they can deal to themselves the identical hands held by the experts during tournaments. Their bidding and mode of play may then be compared to that of the experts, and through the results obtained, attempt to learn what mistakes, if any, were made and attempt to fathom the reasoning of the experts.

The overlays may be indexed by numerals or characters 15 whereby the particular hand to be played may be quickly selected from a master index. If desired, the overlays may also have printing signifying the particular hand in a particular tournament which corresponds to the cards distributed according to the overlays.

I claim:

1. A playing card distribution system for distributing a predetermined arrangement of playing cards to each of a number of players, said system comprising:
   a deck of playing cards, each card of said deck having a coded back side;
   said coded back side including a set of marks disposed thereon in a predetermined pattern, said pattern being identical on each card list longitudinally and/or laterally displaced from the borders of each said card by a different amount to provide a unique code for each said card;
   an overlay card having a plurality of groupings of apertures, said groupings of apertures being at least equal in number to the number of players; and
   means disposed on said overlay for identifying the player who is to receive each said card upon registration of one of the marks of said set of marks with an aperture of said overlay; whereby each said card is uniquely coded and each player will receive certain ones of said cards as dictated by said overlay.

2. The system as set forth in claim 1, wherein said set of marks comprises:
   a plurality of dots arranged in said predetermined pattern; and
   said predetermined pattern extending over more than half of said card.

3. The system as set forth in claim 2, wherein said pattern is assymetrical with respect to the center of said cards.

4. The system as set forth in claim 2, wherein:
   the position of said dots forming said pattern on each of said cards is determined in accordance with a pattern card associated with said dots; and
   the position of said apertures within each of said groupings is defined in accordance with said pattern card associated with said dots.

5. The system as set forth in claim 4, wherein said pattern card for said dots includes a plurality of grid patterns, each said grid pattern comprising:
   a plurality of numbered squares at least equal in number to said playing cards;
   a plurality of unnumbered squares at least equal in number to said playing cards; and
   said numbered squares and said unnumbered squares being alternately arranged in the columns and rows of each said grid pattern.

6. The system as set forth in claim 5, wherein said identifying means comprises:
   a symbol positioned in proximity to each of said groupings of apertures for identifying one of the players; and
   a line of demarcation extending about each of said groupings of apertures and said symbol associated with said groupings of apertures.

7. The system as set forth in claim 6, wherein
   said plurality of dots number four; and
   said plurality of groupings number four.

8. The system as set forth in claim 7, wherein
   said pattern card includes a first, second, third, and fourth grid pattern corresponding to the first, second, third and fourth dot of said four dots, respectively.

9. The system as set forth in claim 8, wherein:
   said first and second grid patterns are longitudinally and laterally displaced from one another by an odd number of squares,
   said third and fourth grid patterns are longitudinally and laterally displaced from one another by an odd number of squares; and
   said first, second, third and fourth grid patterns are not in an overlapping relationship.

10. The system as set forth in claim 9, wherein:
   an index is disposed in alternate ones of said squares in each of said grid patterns, each of said indices corresponding to one of said playing cards to provide a key for positioning said dots on respective ones of said playing cards and to provide a key for positioning said apertures in said overlay card.

* * * * *